April 30, 1968  C. L. SHANO ET AL  3,381,210
ALTERNATOR-REGULATOR SYSTEM WITH ARC REDUCTION MEANS
Filed March 10, 1964  2 Sheets-Sheet 1

INVENTORS.
Charles L. Shano
Frederick P. Hill
By: Mueller & Aichele
Attys.

INVENTORS.
Charles L. Shano
Frederick P. Hill

United States Patent Office 3,381,210
Patented Apr. 30, 1968

3,381,210
ALTERNATOR-REGULATOR SYSTEM WITH
ARC REDUCTION MEANS
Charles L. Shano, Morton Grove, and Frederick Paul
Hill, Elgin, Ill., assignors to Motorola, Inc., Franklin
Park, Ill., a corporation of Illinois
Filed Mar. 10, 1964, Ser. No. 350,762
3 Claims. (Cl. 322—100)

This invention relates to alternators, and more particularly to an alternator wherein arcing between the slip rings and the brushes that ride on them is reduced.

Alternators generally incorporate a rotating field winding with current being supplied thereto from a regulator through slip rings and brushes engaging the slip rings. Vibrations, wear, dirt, or eccentricities in the slip ring may cause the brushes to occasionally separate from the slip rings for a brief instant. When this occurs, the electromagnetic field in the field winding collapses producing a high reverse voltage and causing an electric arc across the gap between the slip ring and the brush so separated. Such arcing can result in pitting and corrosion of both slip rings and brushes, causing rapid deterioration of the apparatus. Furthermore, if the alternator is used in an explosive atmosphere, the possibility of such arcing necessitates enclosing the brushes and slip rings in an air tight structure, greatly increasing the cost of the alternator.

Accordingly, it is an object of this invention to provide an alternator wherein arcing between the slip rings and the brushes which engage the slip rings is reduced.

Another object is to increase the operating life of alternators by reducing wear and deterioration thereof produced by rapid cut off of current to the field of the alternator.

Still another object of the invention is to provide an alternator that may be used in an explosive atmosphere without the necessity of sealing the slip rings and brushes in an air tight enclosure.

A feature of the invention is an alternator wherein a diode connects to the slip rings through which current is supplied to the field winding of the alternator, with the diode being poled to provide a return path for energy stored in the field winding upon interruption of current thereto.

Another feature of the invention is the provision of a damping capacitor or resistor connected in parallel with the diode in order to damp transients to compensate for the conduction time of the diode.

Still another feature of the invention is the provision of an alternator having a diode connecting the two slip rings therein and disposed in a space between one of the slip rings and the rotor. In addition to preventing arcing between the rings and the brushes, the diode will also protect the output transistor of a voltage regulator supplying current to the field winding.

An alternator which may incorporate the invention includes a drive shaft and a rotatable inductive field winding driven thereby. A pair of slip rings are mounted concentric with the shaft and are rotatable therewith. The slip rings are respectively connected to opposite ends of the field winding for supplying current thereto. Brushes are fixed with respect to the rotating slip rings and are engageable with the same to accomplish electrical connection therebetween. A voltage regulator, such as for example a transistor switching type regulator, may be connected to the field winding through the brushes and slip rings for supplying a pulsating direct current thereto.

In accordance with the invention, a diode is disposed in a recess in one of the slip rings and is connected between the slip rings across the field winding. The diode is poled to provide a return path for energy stored in the field winding upon interruption of the supply of current thereto. In the event the brushes and slip rings separate, arcing therebetween due to field collapse is prevented by dissipation of energy in the return path provided by the diode. An impedance device such as a resistor or capacitor may also be disposed in the recess, connected in parallel with the diode. This will damp transients and compensate for the conduction time of the diode.

Figures 1, 2:
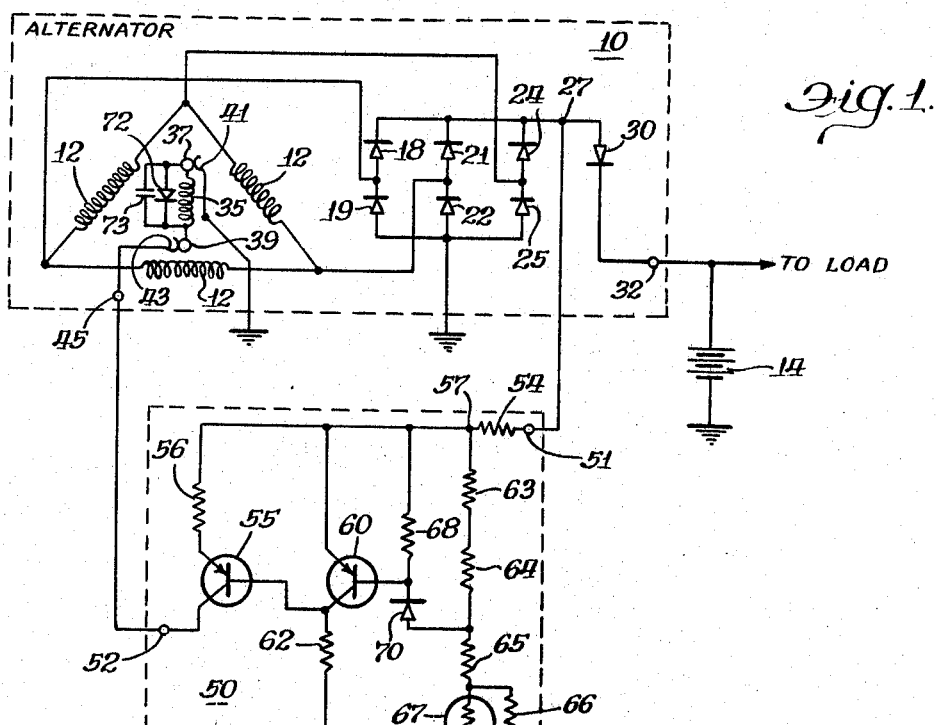
FIG. 1 is a schematic diagram of an alternator-regulator system constructed in accordance with the invention.
FIG. 2 is a rear elevational view of an alternator incorporating the invention.

In FIG. 1, the alternator 10 is shown schematically and includes armature windings 12 connected in delta. As an alternative a wye connection could also be used. The corners of the delta are connected to the respective interconnections of semiconductor power rectifier pairs 18, 19 and 21, 22 and 24, 25. One side of each of rectifiers 19, 22 and 25 is connected to a common reference ground potential which may conveniently be the alternator frame, while the other side of each of rectifiers 18, 21 and 24 is connected to an output terminal 27 of the alternator. The rectifiers are poled to produce full wave rectification of the three-phase output of the alternator. The direct current so produced (positive with respect to the reference ground in the illustrative circuit shown) appears at output terminal 27 of alternator 10, which alternator may be formed as a unitary structure with the semiconductor rectifiers. Of course, it would be within the scope of the present invention to utilize an alternator without the three-phase rectification of the AC output.

A diode 30, which also may be formed as a structural part of alternator 10, is connected between output terminal 27 and an additional output terminal 32. Diode 30 is poled to provide conduction from the rectifier output of the alternator to output terminal 32. Diode 30 prevents conduction from a battery 14, which may be provided in the load, through the voltage regulator. Alternator 10 also includes field winding 35, one end of which is connected through slip ring 37 and brush 41 to the reference ground, and the other end of which is connected through slip ring 39 and brush 43 to a field current supply terminal 45.

Although various types of voltage regulators may be used in the system, a transistorized regulator is advantageous from the standpoint of improved control and reliability. The transistorized voltage regulator 50 has an input terminal 51 which is electrically connected to the output terminal 27 of alternator 10. The electrical path from the input terminal 51 of the regulator includes a resistor 54. The regulator further includes a field current supply terminal 52 connected to terminal 45 of the alternator. Regulator 50 is connected to a reference point for the electrical system through a suitable reference conductor 53.

The PNP power transistor 55 of regulator 50 has a collector electrode connected to terminal 52 and an emitter electrode connected through bias resistor 56 to lead 57. The emitter-collector conduction path of transistor 55, accordingly, completes a field current path from terminal 27 of alternator 10 through resistors 54 and 56 to transistor 55. Transistor 55 supplies field current through field current input terminal 45 and through field winding 35 to reference ground.

The bias potential for the base electrode of transistor 55 is supplied in accordance with the output of alternator 10 at terminal 27 in order to control the current through field winding 35 for regulating the alternator output. The base control voltage for transistor 55 is established by the emitter-collector electrode current path of PNP control transistor 60, and of the resistor 62, which are connected in series between lead 57 and reference point 53. The junction of the collector of transistor 60 and resistor 62 is connected to the base of transistor 55. A voltage divider, including resistors 63, 64, 65 and 66, is series connected between the lead 57 and reference point 53. Temperature dependent resistor 67, selected to effectively track the desired voltage requirements of the load at different temperatures, is connected across resistor 66. A further resistor 68, is series connected with Zener diode 70 between lead 57 and the junction of resistors 64 and 65. The junction between resistor 68 and Zener diode 70 is connected to the base of transistor 60. The voltage divider 63 through 66 produces a bias potential on Zener diode 70 so that it will conduct when a given voltage exists between lead 57 and reference point 53. When diode 70 conducts, it establishes a constant potential at the base of transistor 60.

Accordingly, as the output voltage of the alternator at terminal 27 increases above a predetermined value, Zener diode 70 conducts to establish a fixed potential at the base electrode of transistor 60, forward biasing the transistor into conduction. This raises the potential on the base electrode of transistor 55 to cut off transistor 55 and hence cut off the current supply to field winding 35. The result is a reduction of the output voltage of the alternator so that the voltage at lead 57 of the regulator is low enough to cause diode 70 to cut off. When diode 70 cuts off, transistor 60 is also cut off and transistor 55 is turned on once again to supply field current to field winding 35, causing the alternator output voltage to rise. Such a switching of the alternator output voltage above and below the established regulation point of regulator 50 will continue at a faster or slower rate to produce an average current through the field winding which provides the desired regulated output voltage.

Because field winding 35 is inductive and hence capable of storing energy, a rapid cut off of current thereto will cause a collapsing field which produces a reverse voltage of great magnitude. Such a cut off of current can periodically occur where slip rings and brushes are used for supplying the electrical connection to the field winding. This is because vibrations, wear in slip rings or brushes, dirt, or eccentricities in the slip ring, can cause a brush to separate from a slip ring for a brief instant. When the field collapses in this manner, the high reverse voltage produced can result in arcing between the slip ring and the brush. Such arcing can cause pitting and corrosion of both the slip rings and brushes, resulting in a rapid deterioration of the apparatus. Furthermore, if the alternator is used in an explosive atmosphere, fire or explosion could result from the arc. To prevent the latter, the slip rings and brushes may be enclosed, but this adds considerable expense to the manufacture of the alternator.

In accordance with the invention, a diode 72 is connected between slip rings 37 and 39 and is poled to provide a return path for energy stored in field winding 35 in the event current is interrupted therein. The stored energy is thus dissipated in the diode return path and no arcing across the gap between the slip ring and the brush occurs. Because of the shorting action of the diode to reverse current, a substantial voltage cannot be developed between the slip rings as required to produce an arc. It may be necessary to damp the leading edge of the reverse voltage pulse with a capacitor 73 in order to compensate for the conduction time of the diode. In place of capacitor 73, a resistor or other impedance element might be utilized in order to reduce the transients.

Figure 3:
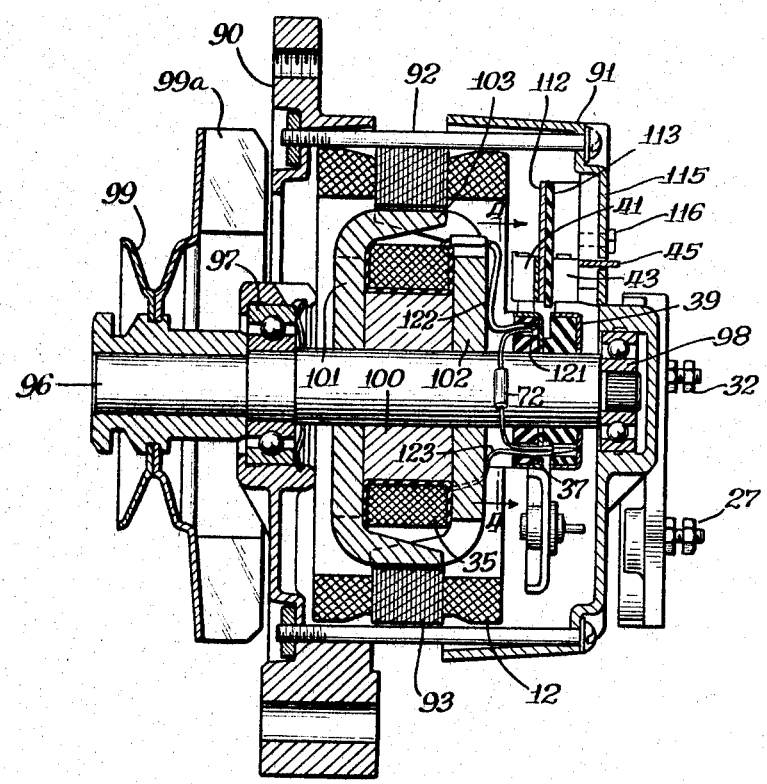
FIG. 3 is a sectional view taken along the line 3—3 of FIG. 2.
Figure 4:
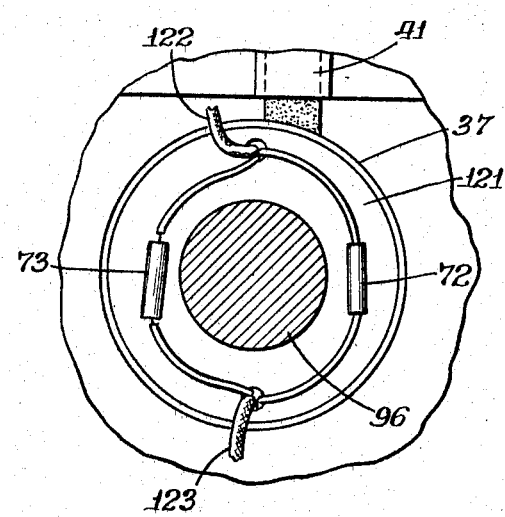
FIG. 4 is a sectional view taken along the line 4—4 of FIG. 3.

FIGS. 2, 3 and 4 show the general construction of the alternator and rectifier assembly. The front frame or housing section 90 is secured to a back frame or housing section 91 by a plurality of bolts 92. Secured between the housing sections is a laminated magnetic structure 93 of the starter of the alternator. Armature winding 12 are disposed on the laminated magnetic structure 93. The rotor structure of the alternator includes a drive shaft 96 supported from the front frame 90 by ball bearing 97, and supported from back frame 91 by ball bearing 98. A pulley 99, which has an integral fan portion 99a, is secured to shaft 96 for supplying torque thereto.

A magnetic structure is provided on the rotor shaft 96, including an annular core member 100 connected to a front pole plate 101 and a back pole plate 102. Each of the pole plates has six integral pole pieces or fingers 103, which are interleaved and interspersed with each other. Field winding 35 is wound about the core 100 and is generally enclosed by the pole plates and fingers. Winding 35 is held in position by the pole plates, and has end leads connected individually to slip rings 37 and 39 on shaft 26. A pair of brushes 41 and 43 are mounted rotationally stationary with respect to the rotating slip rings 37 and 39 to be engageable therewith. The brushes 41 and 43 are supported on a channel shaped bracket 112 connected to the back housing section 91. The brush 41 is conductively connected to the conducting bracket 112 to furnish a ground connection from the housing to one side of the field winding. The brush 43 is mounted on insulated plate 113 and is thereby insulated from the housing of the generator. Connection is made to the brush 43 through conducting arm or terminal 45 which extends from the brush 43. The arm 45 extends through an opening in insulating cover 115, which is secured to the back housing 91 by screws 116 which support both the insulating cover 115 and the bracket 112. The brushes may be removed from the alternator for replacement or repair by merely removing the screws 116 and withdrawing the bracket 112 with the brushes thereon. The exciting current for winding 35, which forms a rotating field, is therefore applied between the arm 45 and the frame or housing of the alternator which constitutes a reference or ground point.

It may be seen in FIG. 3 that slip ring 37 is spaced somewhat from plate 102 of the armature. The core 121 of ring 37 is of insulating material such as some type of phenolic resin or plastic. Holes are provided in this material and lead 122 connects one side of field winding 35 to slip ring 37, passing through one of the holes. Similarly, lead 123 passes through a hole in slip ring 37 to connect slip ring 39 with the other end of field winding 35. Diode 72 is disposed in the space between slip ring 37 and plate 102 and is connected from the slip ring termination of lead 122 to the slip ring termination of lead 123. Diode 72 is therefore connected from slip ring 37 to slip ring 39, across field winding 35, and is poled to provide a return path for energy stored in field winding 35 upon interruption of current therein. Such interruption could occur when brushes 41 or 43 leave their respective slip rings 37 and 39.

It should also be noted that because regulator 50 is of the switching type, high reverse voltages are induced in field winding 35 upon cut off of transistor 55. Such high reverse voltage might damage transistor 55 were it not for the fact that diode 72 provided a dissipating path for such transients. Accordingly, in addition to preventing arcing between the slip rings and brushes, diode 72 also protects the output transistor of the regulator.

By connecting the energy discharge diode 72 between the two slip rings, it is connected directly across the field. This provides superior arc suppression to not only extend the brush and slip ring operating life, but to eliminate the need for special brush enclosures and equipment so that the alternator can operate safely in explosive atmospheres. Existing alternators may be modified in this manner to improve their performance. In addition to diode 72, the damping capacitor 73, or a damping resistor may also be included in the space between slip ring 37 and plate 102 of the rotor.

We claim:
1. An alternator-regulator system including in combination, an alternator comprising a rotatable structure having both inductive field winding means and first and second slip rings concentrically mounted thereon and rotatable therewith, first and second conductors respectively connecting said first and second slip rings to said field winding means to provide a conductive path for supplying current thereto, a pair of brushes respectively engageable with said rotatable slip rings to accomplish electrical connection therebetween, and a switching type voltage regulator having an output transistor connected to said brushes for supplying pulsating direct current to said field winding means, said regulator including a circuit connected to said output transistor to cause the same alternately to conduct and supply current to said field and to cut off and interrupt such current supply thereto, said rotatable structure of said alternator further including diode means rotatable therewith and connected to said conductors and in series with said field winding means, diode means being poled to provide a return path for energy stored in said field winding means upon interruption of current therein which is independent of said slip rings and said brushes, whereby arcing between said slip rings and said brushes is reduced by dissipation of energy in the return path, and whereby the likelihood of damage to said output transistor is reduced.

2. A system in accordance with claim 1 wherein said rotatable structure includes a drive shaft, and said winding means and said first and second slip rings are spaced along said shaft, with said first conductor connecting one end of said field winding means to said first slip ring and said second conductor connecting the opposite end of said field winding means to said second slip ring, and wherein said first slip ring has an insulating part with an opening therein through which said second conductor passes.

3. A system in accordance with claim 1 wherein said rotatable structure includes damping impedance means connected in parallel with said diode means.

References Cited
UNITED STATES PATENTS

| | | | |
|---|---|---|---|
| 1,453,410 | 5/1923 | Slepian | 310—220 |
| 1,966,077 | 7/1934 | Nyman | 317—11 |
| 2,991,396 | 7/1961 | Shurr | 317—11 |
| 3,105,930 | 10/1963 | Tuscher. | |
| 3,151,288 | 9/1964 | Avizienis et al. | |
| 2,800,598 | 7/1957 | Whitcraft | 310—220 |
| 3,252,025 | 5/1966 | Brown et al. | 310—263 X |
| 3,253,167 | 5/1966 | Bates et al. | |

JOHN F. COUCH, *Primary Examiner.*

WARREN E. RAY, *Examiner.*

J. J. SWARTZ, H. HUBERFELD, *Assistant Examiners.*